US011609169B2

(12) United States Patent
DeWald et al.

(10) Patent No.: US 11,609,169 B2
(45) Date of Patent: Mar. 21, 2023

(54) ANALYSIS OF MATERIAL PROPERTIES OF INTERNAL SURFACES USING MACHINING PROCESSES TO ENABLE STRESS RELIEF IN THE MATERIAL UNDER TEST

(71) Applicant: Hill Engineering, LLC, Rancho Cordova, CA (US)

(72) Inventors: Adrian T. DeWald, Sacramento, CA (US); Michael R. Hill, Davis, CA (US); Teresa Wong, Sacramento, CA (US); Brett Watanabe, Sacramento, CA (US); Eric Summer, Sacramento, CA (US)

(73) Assignee: HILL ENGINEERING, LLC, Rancho Cordova, CA (US)

( * ) Notice: Subject to any disclaimer, the term of this patent is extended or adjusted under 35 U.S.C. 154(b) by 76 days.

(21) Appl. No.: 17/124,248

(22) Filed: Dec. 16, 2020

(65) Prior Publication Data
US 2021/0172845 A1 Jun. 10, 2021

Related U.S. Application Data

(63) Continuation-in-part of application No. 16/201,994, filed on Nov. 27, 2018, now Pat. No. 10,900,768.
(Continued)

(51) Int. Cl.
*G01N 3/58* (2006.01)
*G01N 3/06* (2006.01)
(Continued)

(52) U.S. Cl.
CPC ............... *G01N 3/58* (2013.01); *G01B 7/18* (2013.01); *G01B 11/161* (2013.01);
(Continued)

(58) Field of Classification Search
None
See application file for complete search history.

(56) References Cited

U.S. PATENT DOCUMENTS

| 3,943,758 A | 3/1976 | Wolf |
| 6,908,766 B2 | 6/2005 | Nien |

(Continued)

FOREIGN PATENT DOCUMENTS

| WO | WO2016/140091 | 9/2016 |
| WO | WO 2016/140091 | 9/2016 |

OTHER PUBLICATIONS

European Patent Office, "Communication pursuant to Rule 164(1) EPC", in European Application No. 18884004.5, Jun. 9, 2021, 14 pages.
(Continued)

*Primary Examiner* — Peter J Macchiarolo
*Assistant Examiner* — Jermaine L Jenkins
(74) *Attorney, Agent, or Firm* — Kang S. Lim

(57) ABSTRACT

Analysis of residual stress in materials is often done in static conditions in a laboratory. Accurate systems and methods for performing these analyses in a dynamic, non-laboratory environment are notoriously difficult and can be very inaccurate. A method using a portable, field deployable apparatus having greater accuracy than currently available is disclosed whereby accurate and repeatable residual stress analysis may be implemented in non-laboratory environments leading to greatly improved diagnostics, maintenance and life limit prediction. Especially the analysis of a pipe or channel can be facilitated with this invention.

28 Claims, 4 Drawing Sheets

Related U.S. Application Data

(60) Provisional application No. 62/592,240, filed on Nov. 29, 2017.

(51) Int. Cl.
    *G01B 7/16*         (2006.01)
    *G01B 11/16*       (2006.01)
    *G01L 5/00*         (2006.01)

(52) U.S. Cl.
CPC ............ *G01L 5/0047* (2013.01); *G01N 3/066* (2013.01); *G01N 3/068* (2013.01); *G01N 2203/0053* (2013.01); *G01N 2203/0647* (2013.01); *G01N 2203/0676* (2013.01)

(56) References Cited

U.S. PATENT DOCUMENTS

| | | | |
|---|---|---|---|
| 7,295,307 B2 * | 11/2007 | Naka .................. | G01N 21/9501 356/32 |
| 8,443,545 B2 | 5/2013 | Deppermann | |
| 9,897,523 B2 | 2/2018 | Bellemare | |
| 10,156,506 B2 | 12/2018 | Okita | |
| 10,261,495 B2 | 4/2019 | Ishii | |
| 10,551,258 B2 | 2/2020 | Okita | |
| 10,900,768 B2 | 1/2021 | DeWald et al. | |
| 2004/0066503 A1 | 4/2004 | Hubner et al. | |
| 2004/0083024 A1 | 4/2004 | Wang | |
| 2013/0319135 A1 | 12/2013 | Okada et al. | |
| 2016/0258852 A1 | 9/2016 | Bellemare et al. | |
| 2016/0273979 A1 | 9/2016 | Yamada | |

OTHER PUBLICATIONS

Venancio Martinez-Garcia et al: "Residual Stress Measurement with Laser-Optical and Mechanical Methods", Advanced Materials Research, vol. 996, Aug. 1, 2014 (Aug. 1, 2014), pp. 256-261, XP055552083, DOI: 10.4028/www.scientific.net/AMR.996.256 *pp. 257,258 *.

Gadow R. et al: "Residual Stress Analysis in Thermally Sprayed Layer Composites, Using the Hole Milling and Drilling Method", Journal of Thermal Spray Technology., [Online] vol. 14. No. 1. Mar. 1, 2005 (Mar. 1, 2005), pp. 100-108, XP055806381, US ISSN: 1059-9630, DOI: 10.1361/10599630522756 Retrieved from the Internet: URL:https://link.springer.comjcontent/pdf/ 10.1361/ 10599630522756.pdf> [retrieved on May 21, 2021] * pp. 100.103 * * figure 9 *.

U.S. Appl. No. 17/124,248, filed Dec. 16, 2020, Analysis of Material Properties of Internal Surfaces Using Machining Processes to Enable Stress Relief in the Material Under Test.

USPTO, ISA/US, "Notification of Transmittal of the ISR and the Written Opinion of the International Searching Authority, or the Declaration," in PCT Application No. PCT/US2018/062910, dated Apr. 29, 2019, 13 pages.

Edited by: Schajer, Gary S., Practical Residual Stress Measurement Methods: John Wiley & Sons Ltd. 2013; cover (2 pages); Chapter 2, "Hole Drilling and Ring Coring" by Gary S. Schajer & Philip S. Whitehead, pp. 29-64; Chapter 4, "The Slitting Method" by Michael R. Hill, pp. 89-108.

Schajer G.S., Roy, George, Flaman, Michael T. (Edited by Lu Jian); Hole-Drilling and Ring Core Methods; Handbook of Measurement of Residual Stresses; Society for Experimental Mechanics, Inc.; 1996; cover (2 pages); pp. 5-34 & pp. 64-67 ; The Fairmont Press, Inc., Lilburn, GA.

Procter E. and Beaney E. M., Advances in Surface Treatments; cover (1 page); The Trepan or Ring Core Method, Centre-Hole Method, Sach's Method, Deep Hole Technique; 1987, pp. 165-198, Pergamon Press.

Measurement of Residual Stresses by the Hole-Drilling Strain Gage Method, Vishay Precision Group, Micro Measurements, Nov. 1, 2010, pp. 19-33.

Valentini E. Benincasa A. and Bertelli L., An Automatic System for Measuring Residual Stresses by the Ring-Core Method, AIAS— Italian Stress Analysis Association, 40th National Convention, Sep. 7-10, 2011, University of Palermo.

Steinzig, M. and Ponslet, E., Residual Stress Measurement Using the Hole Drilling Method and Laser Speckle Interferometry: Part 1; cover (1 page); Experimental Techniques, May/Jun. 2003, pp. 43-46.

Keil, S., Experimental Determination of Residual Stresses with the Ring-Core Method and an On-Line Measuring System, Experimental Techniques, Sep./Oct. 1992, pp. 17-24.

European Patent Office, "Communication pursuant to Article 94(3) EPC", in European Application No. 18884004.5, Oct. 17, 2022, 8 pages.

Ersoy Nuri et al.: "Measurement of Residual Stresses in Layered Composites by Compliance Method", Apr. 30, 2000 (Apr. 30, 2000), XP055968725, DOI: 10.1177/002199830003400703 Retrieved from the Internet: URL:https://www.researchgate.net/publication/ 241652986_Measurement_of_Residuai_Stresses_in_Layered_ Composites_by_Method [retrieved on Oct. 6, 2022].

Vishay RS-200, Tech Note TN-501-2, TN-503-6, Vishay Precision Group, Strain Gauges and Instruments, Document No. 11053, Revision: 01, pp. 19-33, Nov. 1, 2010.

Olson, DeWald, and Hill, Precision of Hole-Drilling Residual Stress Depth Profile Measurements and Updated Uncertainty Estimator, Experimental Mechanics, ISSN 0014-4851, Exp Mech, DOI 10.1007/ s11340-020-00679-1.

Designation: E837-08 (the "ASTM E837-08 Standard")—Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Feb. 1, 2008. Published Apr. 2008. Originally approved in 1981. Last previous edition approved in 2011 as E837-01.

Designation: E837-13a (the "ASTM E837-13a Standard")— Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Sep. 15, 2013. Published Oct. 2013. Originally approved in 1981. Last previous edition approved in 2013 as E837—13 DOI: 10.1520/E0837-13A.

Designation: E837-20 ($_{the}$ "ASTM E837-20 Standard")—Standard Test Method for Determining Residual Stresses by the Hole-Drilling Strain-Gage Method, Copyright, ASTM International, 100 Barr Harbor Drive, PO Box C700, West Conshohocken, PA 19428-2959, Edition approved Oct. 1, 2020. Published Nov. 2020. Originally approved in 1981. Last previous edition approved in 2013 as E837—31a DOI: 10.1520/E0837-20.

Schajer, Hole Eccentricity Correction for Hole-Drilling Residual Stress Measurements, Experimental Mechanics, Aug. 24, 2022.

Wang, Refined Analysis of the Relieved Strain Coefficients for the Off-center Hole-drilling Case, Experimental Mechanics, pp. 367-371, Dec. 1990.

Sandifer and Bowie, Residual Stress by Blind-hole Method with Off-center hole, Experimental Mechanics, pp. 173-179, May 1978.

Monaca et al., Surface integrity in metal machining—Part II: Functional performance, International Journal of Machine Tools and Manufacture, 164 (2021) 103718, pp. 1, 14, 15, 36, 39.

* cited by examiner

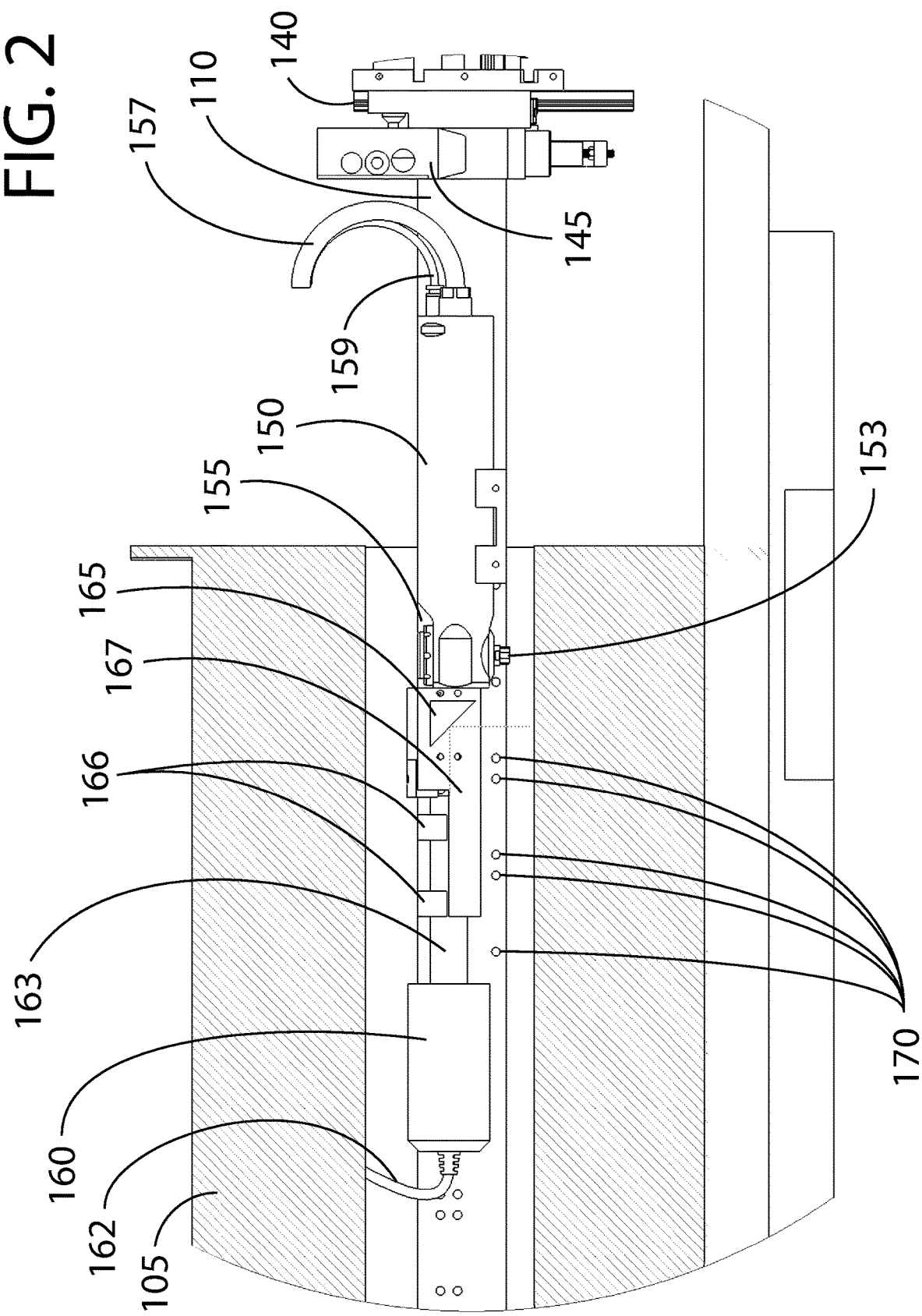

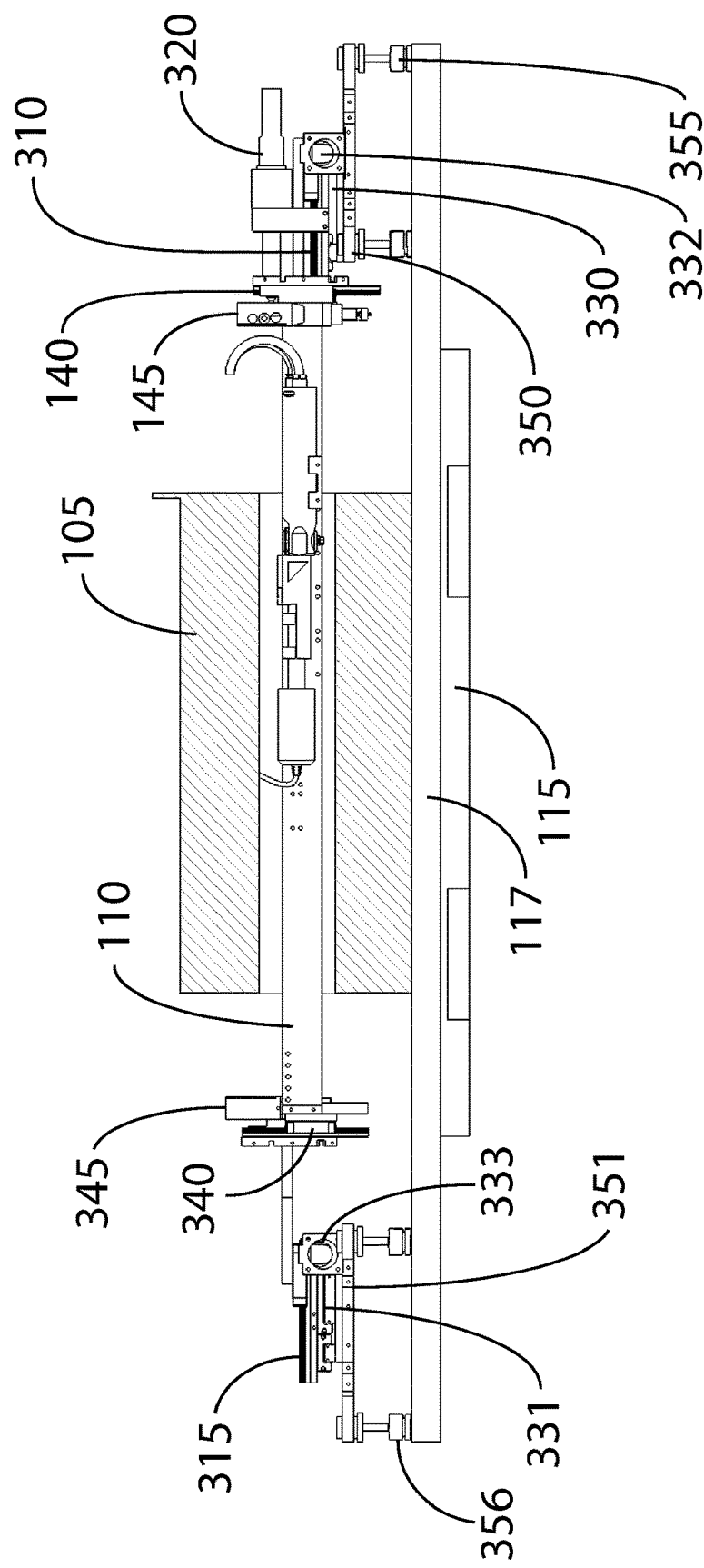

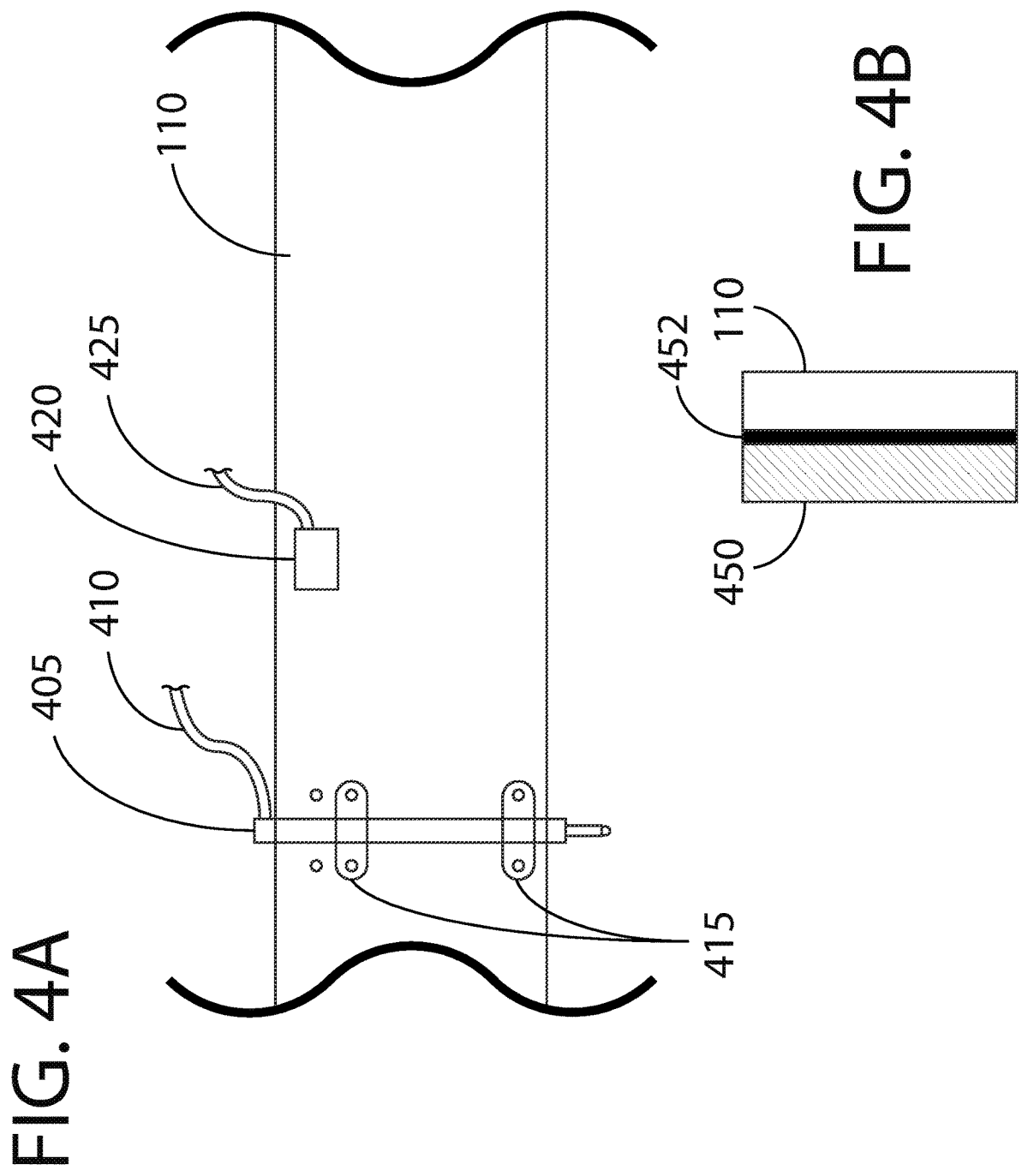

ANALYSIS OF MATERIAL PROPERTIES OF INTERNAL SURFACES USING MACHINING PROCESSES TO ENABLE STRESS RELIEF IN THE MATERIAL UNDER TEST

CROSS REFERENCE TO RELATED APPLICATIONS

This non-provisional application is a continuation-in-part application of and claims the benefit and priority of U.S. application Ser. No. 16/201,994 filed on Nov. 27, 2018, recently allowed, which in turn claims the benefit of provisional application No. 62/592,240, filed Nov. 29, 2017, which applications are incorporated herein in their entirety by this reference.

BACKGROUND

A consequence of manufacturing is that when metals are formed, through any method or technique, residual stresses are created in the material that may compromise the quality of the material and its performance and may be difficult to quantify. It is common to find methods, such as heat treatment, that are used to reduce the magnitude of residual stresses but in general there are almost always some residual stresses after a process or treatment is completed. In some manufacturing processes, residual stresses may be deliberately created. As an example, mechanical surface treatments used to improve fatigue performance, such as shot peening using steel shot or laser peening, build residual stresses into the surface of a material. Chemical treatments such as nitriding, or case-hardening, heating in a nitrogen rich atmosphere so as to build a surface into which nitrogen has been diffused, are common processes. Surface treatment affects only a very thin layer of the metal but this is relied on to reduce or prevent the formation of cracks which become points of origination of failure; typically a crack is an area of extreme stress, or stress riser, which may propagate over time leading eventually to the destructive failure of the component.

Because the practical characterization of material residual stress is difficult, a routine engineering solution is to develop a process which ensures that failure modes or lifetimes are achieved on a statistically significant basis. One consequence of this is that the processes are often stochastic in nature and determined experimentally. It should be evident that building in safety factors supported by low-quality data is costly and fraught with uncertainty; using what are only believed to be representative samples in a laboratory is one example of an uncertainty leading to questionable data. It is clear, then, that an urgent need exists for systems and methods that improve such processes so that accurate residual stress measurements may be made on component parts that have been or will be in use. There is also a need for greatly improved accuracy in the machining performance of machining equipment normally used in analysis work at an economical price point. There is an advantage to being able to do the analysis work in the field, thus avoiding the costs and delays when parts must be dismantled, removed and then shipped to a remote facility for analysis. This is especially true where critical components for high value systems are being considered. For example, the consequences of failure of a turbine blade can be catastrophic but detection of failure onset is difficult with current processes. Speed of development is compromised by delays introduced when a component part has to be moved to a remote facility and so the opportunity to be able to bring the analytical process to the part quickly becomes beneficial. A further benefit is that the task of tracking a part is simplified since the part need never leave the facility where it is housed. In some cases, the effort to move a large part, such as a large pipe which may require excavation, is simply impractical and being able to bring the analysis to the part is a far better solution.

One aspect of difficulty in performing stress analysis on internal surfaces occurs when the part to be machined exhibits significant curvature relative to the dimensions of the machining equipment, such as machining that is to be done inside a pipe or interior channel. The requirement that the machining elements be positioned within the pipe or channel automatically determines the minimum dimensions which can be serviced, but the ability to accurately perform such machining work places significant constraints on the machining tool itself and introduces challenges not found where access is simple.

Measurement of surface residual stress of a material sample can be performed by mechanically removing material locally and then measuring a parameter which is related to the residual stress; typically the change in strain or deformation is measured as a function of the material removed. An implementation of this is commonly achieved by attaching a strain gauge array to the region of interest, drilling a small blind hole in the part and then measuring the effect of this residual stress release by measuring the change in strain using strain gauges that are radially disposed close to the hole. This typically requires three or more strain gauges to be applied to the material, recording accurate position and angle data for their location and then mathematically deriving the residual stress due to the resultant strain, relative to a predetermined axis in the material. Current technology incorporates these three strain gauges onto a single substrate that may be attached as a single part; the array generally has two gauges orthogonally positioned with a third at 45° relative to the other two. As is normal practice, each gauge element incorporates center-line marking that facilitates alignment and allows the residual stress to be calculated in any direction on the plane using well known mathematics.

One of the better known and widely used techniques for finding near surface residual stress requires a small hole to be accurately drilled in the center of the strain gauge array, which relieves local residual stress and the resultant strain which is measured is related mathematically to the change in residual stress. The term "center" refers to the point of intersection of the marked axes of the gauge array's elements and in this case the strain gauge is sometimes referred to as a rosette. The elements in this case are either radially disposed around the center in a whole circle or else radially disposed in one quadrant of a whole circle. The hole is generally made to have a depth which is equal to one half of its diameter. Another technique involves cutting a slit of predetermined depth across a representative face of the material measuring the strain change due to slitting, and then calculating residual stress from measured strain.

Typically, a component part would be received at a laboratory and then be sectioned or cut so as to allow the element of interest to be accurately positioned on a machine that would be used to either drill a hole or cut the slit. The more that a part is handled, the greater the chance of altering the residual stress in the part to be tested. Further, jigging and clamping of the sample introduce other forces that apply stress to the part. Prior to machining, the element that will be analyzed must have a strain gauge applied, which typically means that the location at which the gauge is to be applied must be cleaned so that the adhesive used to secure the gauge, or gauge array, will be effective. Wires are then connected so that the reference value may be measured and recorded. A typical measurement uses the strain gauge element as part of a Wheatstone bridge array, which is well known in the measurement art.

In circumstances where the surface proximate to the point at which the stress analysis work is to be done is conveniently accessible, flat, or nearly so, the application of a strain gauge assembly is routine. However, when significant curvature is present the task is more onerous since the strain gauge assembly itself will be distorted when it is applied and secured unless even pressure is carefully applied. When the surface where the strain gauge is to be applied is within a channel or a pipe then the accessibility is limited and it may be extremely difficult to attach a strain gauge assembly and sometimes impossible. In these circumstances a precision optical method is capable of providing the strain measurement from which the stress may be calculated.

Hence there is a clear need for an appliance that is not entirely dependent on a laboratory environment for producing very high quality results, by, for example, improving accuracy of existing relatively portable equipment for measuring surface residual stress of an internal surface of a material sample under test.

SUMMARY

The current invention relates to systems and methods for analysis of material properties of components and structures using machining processes to enable stress relief in the material under test. In particular, this invention concerns apparatus and methods to perform precision machining within the bore of a pipe or channel and is particularly applicable to test parts having other than zero curvature. In addition, the systems contemplate precision measurement in an environment having other than zero curvature.

Fixed laboratory facilities for the analysis of the residual stress condition of a component are capable of yielding exceptional measurement results, but these are usually expensive to implement, requiring permanent housing and costly handling and documentation processes to support a range of customers. A system and method are described, capable of field deployment as well as fixed laboratory operation. Because of the difficulties of operating inside channels or pipes where access is restricted, a beam supported at either end is fitted with a machining apparatus and an imaging system of sufficient resolution to measure the changes in the strain condition of the part under test. The beam supports at either end provide either one or both of translational and rotational action in two or more axes, allowing precise positioning of the imaging system and an associated machining system relative to the part under test so that progressive stress relief can be created in the part under test.

In larger components, such as a large diameter pipe or a channel having a large radius of curvature in the region of interest, it may be convenient to install a strain gauge system as described in the cited parent application (Ser. No. 16/201, 994) but as the radius of curvature diminishes, placement and connection to a strain gauge system become less convenient. In this case an optical imaging system can be used to measure the change in strain more conveniently. By using a suitable lighting system to provide monochromatic or polychromatic light and interferometry methods, exceptional resolution can be achieved and the data processed and stored as required to enable the strain measured to be related to the stress condition of the material of the part under test. Modern light emitting semiconductors including laser diodes are already miniaturized and can be mounted on the apparatus for best effect. Similarly, fiberoptic components can be used to transport both lighting and image data as required.

Once initial reference values have been established, such as for the locations of the optical reference marks and the associated feature point or points for machining, the part may be aligned relative to the apparatus or vice versa in preparation for the cut. Once machining is completed, either the new strain gauge readings or the change in optical strain values can be resolved; in some cases this measurement may be done in situ; in the case of a pipe or channel an in situ measurement is necessary to ensure that the measurement is not invalidated through calibration loss by detaching and then reattaching the equipment. The differences between these new strain values and the reference, or initial values previously established correspond to the residual stress values before the machining process relieved the residual stress that was initially present.

One of the objectives of this invention is to improve the accuracy beyond what is currently available, to mitigate the need to cut larger test pieces so that they may be fitted to a machine for cutting the residual stress relief feature, to improve the quality of residual stress measurements through development of a single integrated appliance, to develop an appliance to perform slitting or slotting, hole drilling, or ring core cutting of an annulus, or to simplify or speed the measurement procedure. By taking advantage of the advancement in computer technologies and advanced materials for the creation of an appliance that may be moved to the part under investigation, a considerable benefit is realized. The appliance may be made highly portable for direct attachment or coupling to the test piece or can be used as a bench machine at a temporary location.

Note that the various features of the present invention described above may be practiced alone or in combination. These and other features of the present invention will be described in more detail below in the detailed description of the invention and in conjunction with the following figures.

BRIEF DESCRIPTION OF FIGURES

FIG. 2 illustrates a side view of the beam assembly in the neighborhood of the camera and cutting sub-system in accordance with the present invention;

FIG. 3 illustrates a side view of the appliance showing the relative positions of the parts, where the part under test is sectioned for clarity and to show the internal view;

FIG. 4A shows how position and vibration sensors can be fitted; and

FIG. 4B illustrates the attachment of a damping material.

DETAILED DESCRIPTION

Figure 1:
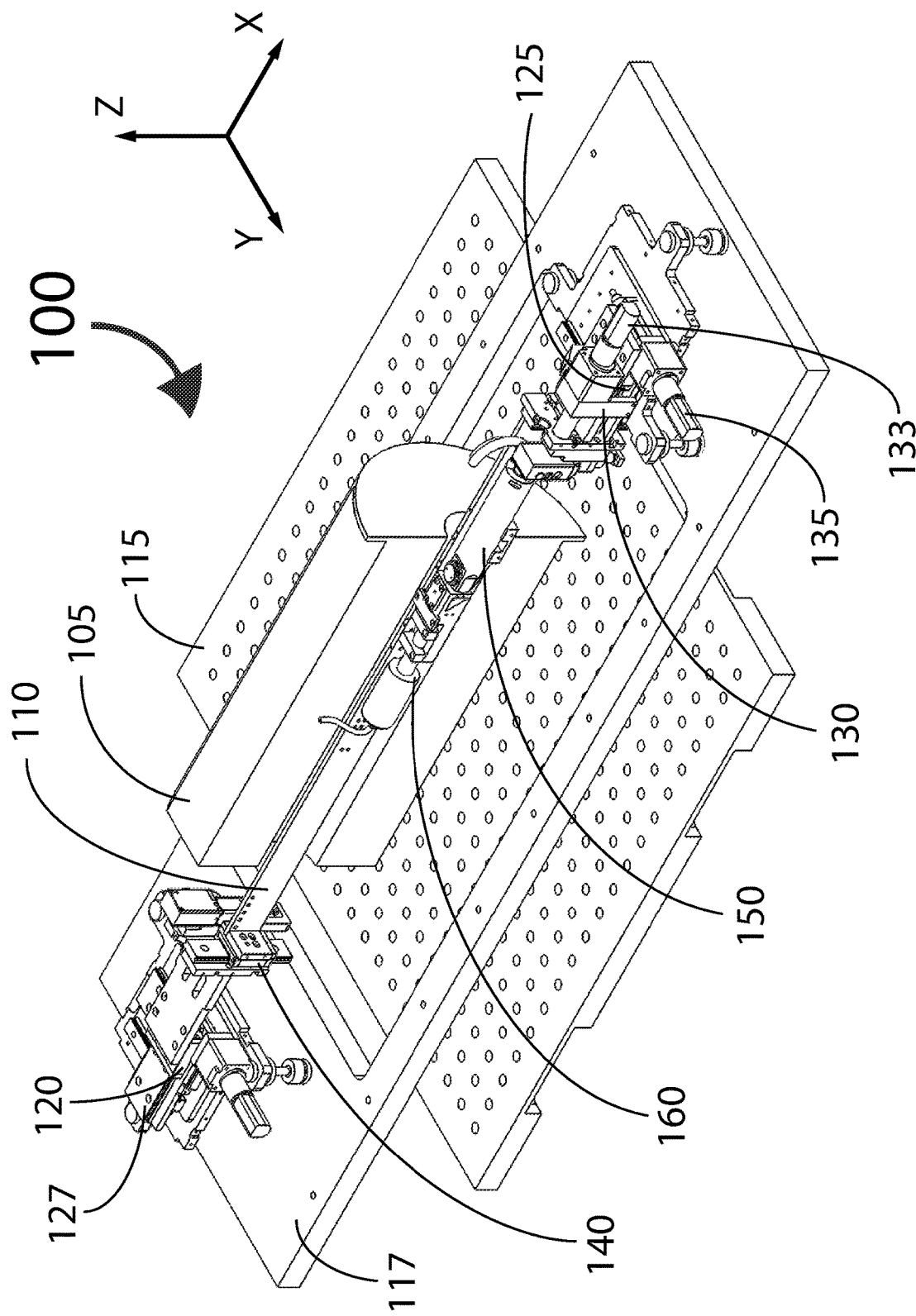
FIG. 1 shows an isometric view of the appliance with a sectioned part for machining.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Methods and apparatus will now be described which facilitate automated residual stress measurement in a material sample located within a pipe or channel, either in a laboratory or on-site, without requiring the material to be relocated to another facility. In particular, processes and measurements are described where access is limited and the region of interest may be other than flat.

Referring briefly to FIG. 1, two motion platforms are shown attached at either end of a beam that lies within a channel in a part to be tested. Upon the beam is located a machining system that will be used to make cuts in the material of the part to be tested and also an imaging system that permits optical measurements to be made. It should be evident that in this figure access is potentially very limited depending upon the channel area and distance from the ends and so a strain gauge method may be unsuitable. Motion of the beam may be in any or all of the axes shown on the figure. One or more locales may be selected at which measurements are to be made. In the case where strain gauges are to be used, after cleaning and attaching a strain gauge or strain gauge array to one or more measurement locales, appropriate to the measurements intended, the one or more strain gauges or arrays may be connected to a measurement device which allows the starting strain to be recorded. Because a newly applied strain gauge is not yet displaced from its starting value of resistance, this is effectively the zero point from which subsequent measurements may be referenced. In one implementation, the strain gauge may be coupled to an analog to digital converter so that the measured data may be recorded as a machine readable file and used subsequent to the completion of any of one or more machining processes to yield a set of associated strains. The residual stress condition of the material may be calculated corresponding to each of the one or more machining steps and the results presented in numerical or graphical form. When attachment of a strain gauge system is impractical or inconvenient, optical technologies are used to make strain measurements. In this case, after cleaning, the surface features are identified using a high-quality camera and lens assembly as well as a light source that is alterable so that features may be appropriately discerned. Accuracy in the process requires that the location of the measurement area relative to the cut or cuts that are to be taken from the material be known and so a very light cut may be taken initially to mark the point from which measurements may be made. Generally, this first light cut may barely remove some of the surface roughness without touching the bulk material and so has minimal effect, if any, on the stress condition of the material of the part under test. In one implementation the process relies entirely upon the optical system to determine position; in a second implementation, position sensors are used to define the position of the cutting tool relative to a starting point. In the simplest case, once the cutting tool is in position, a hole is drilled by a succession of light cuts into the material of the part under test. The process may be interrupted at any point so that the strain condition of the part local to the machined feature can be assessed.

In some embodiments, a small slot may be cut into the surface of the material. This slot may have a predetermined form and be cut normal to the surface at the point of the feature. The plane of the slot is, preferably, aligned orthogonally to the sensitive direction of the strain gauge when a single gauge is used, but when a rosette array is used this is a lesser concern. When an optical system is used, the alignment problem is less onerous because displacement or strain is measurable in all directions and does not require the resolution of components of movement in the same way as a strain gauge solution. In areas of significant curvature, the machined feature may be angularly offset by a small amount according to compensation rules, if any, that an inspector assigns to the analysis. Especially in a pipe or channel, although the long axis of the pipe or channel permits a cut not dissimilar to a cut on a plane surface, an annular cut requires circumferential motion of the cutting tool in addition, which requires exceptional accuracy in placing the rotational axis of the machine tool relative to the longitudinal axis of the pipe or channel, or else any offset must be measured and a compensation plan developed prior to starting to cut to ensure adequate depth control of the feature. The optical image used to perform measurements must also be compensated in a like fashion so that if the axis of rotation is not simply offset, but lacks parallelism, this too may be compensated during the measurement phase. In one implementation the appliance has no rotational axis, but relies upon the fine definition of the three dimensional rectilinear positioning system to make cuts in a region of high curvature. In another implementation, the support beam is attached to a rotating mechanism that allows the tool and imaging system to be moved circumferentially to aid in cutting areas of high curvature.

In a basic implementation, the apparatus comprises a pair of linear slides at each end of the beam, mounted to a base plate upon which the part containing the internal channel or pipe is mounted and that may be accurately positioned relative to the location of a strain gauge or optical feature in the channel that will be used to measure strain. The first of the pair of slides 120 and 125 may be moved with high accuracy relative to the base plate along the direction of the slide ideally parallel with the longitudinal axis of the part to be machined. This positioning may be done, preferably, using a linear actuator at each slide, though other methods that are known to those having ordinary skill in the art may be employed. The second slide of the pair 140 controls movement of the beam along the z-axis and moves the cutting tool closer to or further from the surface to be machined and positioning control may be automated so as to relieve the operator of excessive burden during the cutting process.

A high speed motor 150 is mounted to a beam that passes through the pipe or channel and which is attached at either end to the slide assemblies so that its position, relative to the slides, which preferably move parallel to at least one plane locally tangent to the work surface, is fixed. A cutting tool is coupled to the motor spindle, the tool being selected to cut the sample material appropriately. The motor mounting on the supporting beam is preferably fixed in one of several pre-determined positions to minimize play. Thus the cut width may be set by choosing the diameter of the cutting tool and the depth of cut set by advancing the vertical slides upon which the beam supporting the high speed motor is mounted. The pair of slides which are attached to the base plate may be moved and, in this way, a linear slot of predetermined width and alterable depth and length may be cut into the material so that the residual stress present in the neighborhood of the gauge or gauge array is interrupted from the residual stress in the bulk material.

By adding a third slide that moves in the same plane as the base plate, the y-axis, and coupling the vertical slide of the motor support beam to this, instead of the first slide that moves along the x-axis, the cutting tool may be moved in three dimensions and, provided the actuation steps are small enough, a slot having a complex profile may be cut without significant penalty to the accuracy of the strain measurement. In one implementation, the vertical z-axis slide is coupled to the x-axis slide which is coupled to the y-axis slide; this slide arrangement can be configured in whatever order best suits the task at hand and is preferably arranged to reduce as much un-necessary cantilever load as possible to minimize play in the system and wear on the precision slides. In another implementation, a strain gauge is mounted and a circular or annular slot is cut so that the resulting island upon which the strain gauge array is now mounted is isolated from the bulk material. In yet another implementation, light indexing cuts are made on the surface to create reference points that can be used by an optical strain measuring system and the annulus cut around this prepared region.

Although a simple beam can be used, it should be understood that stiffness of the support beam is essential to ensure good quality machining. Accordingly a stiffened beam is preferred. A T-shaped beam provides an improvement and a Z-shaped version is better. If an I-shaped beam is preferred it is important to ensure that the cutting tool and optical system are not affected unduly. Machined slots or holes may be required to clear the tool and provide a sight line for the imaging system. In practice a series of holes or slots may be required to allow for flexibility in the mounting positions for these elements of the system. When the beam is of significant length, a twisting moment may be present from the action of the cutting tool in some circumstances and an unhelpful resonance will prevent accurate machining. In this case, a rectangular tube can be used as the support beam for its improved stiffness in twist and one external surface used to mount the system components.

To facilitate accurate positioning, an optical system can be used. In one implementation a camera with an appropriate lens system is located so that its viewing axis is in the plane of the cutting spindle and approximately parallel with the spindle. In this way, the distance offset between a point defined by an optical graticule attached to the camera and the center of the cutting tool may be determined and this offset calibration factor applied to the control electronics so that once a point is located, then the tool may be moved to the same point so that a cut may be performed based on that reference. Simple geometry and trigonometry may be used to compensate for misalignment errors using a test coupon to make this determination. These compensation factors may then be stored and subsequently applied to the measurements made on the part under test.

In yet another implementation, a fiber optic component is used so that the camera element may be remotely located. Modern camera components are highly miniaturized and, provided that the viewing lens is protected or shrouded from metal debris that results from the cutting action of the tool, may be located close to the cut axis. A second camera may be accommodated so that the cut may be monitored live at the time of cutting; this is preferable to complexity resulting from having to switch the optical path using mirrors or other systems and aids the placement of views if the desired viewing features exceed the viewing field of the system.

A further implementation incorporates a profiling tool that allows the machine to develop an accurate profile of the part to be machined so that the machining features may be complex and not limited to simple cuts in the z-axis. For reference, the x-axis and y-axis are defined to be in the plane of the base plate of the machine and the z-axis is that axis orthogonal to that plane. It should be evident that the use of Cartesian (x, y, z) coordinates are purely for ease of description and circular (r, θ, φ) coordinates may also be used.

In a finely detailed explanation of FIG. 1, the appliance 100 is shown with the machining tool support 110 inserted through a test part 105; this latter is shown sectioned so as to expose the internal detail of the appliance. The support beam or bar 110 is secured at both ends to slide assemblies 120 and 125 which in this figure enable movement in the x-axis along the longitudinal axis of the tube or channel that lies within the part under test 105 and the y-axis that moves the support bar 110 radially within the tube or channel approximately parallel to the base plate of the work table 115 to which may be secured the base plate of the appliance 117. The support bar can also be moved vertically in the z-axis by a vertical slide 140 at each end that allows accurate control of the cutting depth. Movement in the y-axis is controlled by a motor 135 and in the x-axis by motor 133. The mount 130 for the x-axis motor 133 is shown for illustration. The component or part under test 105 must be secured relative to the appliance 100 and this may require fixtures and fittings such as clamps and screws which will be specific to the part under test and are therefore not shown in this figure to avoid unnecessary detail. The cutting tool itself is normally secured to the cutting motor using a collet assembly so that it can be changed or replaced easily. Thus the support bar can be moved so as to position it in a way that allows the intended cut feature to be created.

The illustration of FIG. 1 shows that the x-axis slide 127 is free moving and the drive along this axis is provided only from one end by motor 133. In an alternative implementation the drive is provided from both ends but requires that the two drive control systems be carefully synchronized or else one of the motors be disengaged while the other is in use. By making sure that the drive along the x-axis is always done with the support bar in tension, compressive forces which may induce buckling or distortion are avoided; the loading in tension is comparatively small, being comprised of frictional effects in the slides at the proximate and distant ends and the resolution of cutting forces that are deliberately kept small.

Secured to the support bar or beam 110 are two or more subsystems. The drive motor assembly 150 includes a transmission system that, if required, alters the direction and/or speed that the driving force used for the cutting tool is applied. The transmission or gearbox is arranged so that the output shaft to which the cutting tool is coupled is equipped with a securing device such as a collet as well as provision for sustaining the loads generated while cutting. The bearing arrangement allows for side-loading as well as end-loading and is preferably a sealed assembly that is permanently lubricated to reduce wear on the gearing that allows the change in direction and/or speed from the motor rotation to the rotation of the cutting tool. A second subsystem is a camera 160 coupled to an optical system that permits the acquisition of images from the surface or surfaces to be machined. In some implementations a lighting system separate from that provided as an integrated part of the camera system is used. Piping or ducting may also be provided to permit air flow to be steered to remove debris from the cutting process as well as to minimize the impact of such debris upon the optical system. In another implementation, optical fibers are positioned on the support bar or beam 110 to allow illumination and/or image transport. In a further implementation, a second camera and any required optical system is provided to allow additional information to be gathered. In yet another implementation, position sensors such as Linear Variable Differential Transducers, LVDTs, or Time of Flight laser based transducers are secured to the beam so as to allow for precision in locating the beam so that its travel along the x-axis is locally parallel to the surface to be cut in the neighborhood of the cutting tool. The advantage of precision measurement of position rather than a reliance solely upon the open-loop accuracy of the drive motors is that in the case of a long beam, the corrections for distortion due to uneven heating or the load distribution along the beam will not now require predetermined correction but will be able to be done at the point of the operation. Further, the addition of vibration sensors to the beam 110 permit the cutting speed to be altered to avoid unintended resonances.

FIG. 2 illustrates an enlarged part of FIG. 1 so as to show inside view some of the detail of the machining systems that are secured to the beam 110. The beam is attached to the vertical slide 140 that enables motion along the z-axis driven by a motor assembly 145. In a fixed system this controls the height of the beam 110 to which the cutting tool (not shown) is coupled by a collet assembly 153 that secures the tool to the output shaft of a gearbox or transmission 155 located at the drive output end of the motor 150. The support beam 110 is attached to a vertical slide at both ends of the beam to allow it to be positioned accurately in the z-direction. The location of the machining sub-assembly components as well as the imaging system is normally defined by the part that is under test 105 since this is the part that is to be machined and the machining location may be at one or more different points within the channel or passage within the part. Because the linear slides that define the motion axes are of limited travel, a characteristic of precision slides manufactured to an economical profile, provision must be made so that the combination of the position of the components along the beam coupled with the travel capability of the slides allows any of the intended points of machining to be accessed without having to relocate the part under test 105 which may be exceptionally massive and unwieldy. Locating holes 170 may be provided at predetermined positions along the beam that can engage with locating dowels or screwed fixtures to permit accurate, reliable attachment of the component parts in the overall appliance. Thus, once the position to be machined has been identified, the reach of the appliance is determined and the suitable location points can be identified and the machining tool drive assembly comprising the motor 150, its gearbox 155 and the cutting tool inserted and secured using the collet 153 can be attached. Power for the motor 150 is delivered using a cable 157 while air, which is used to cool the motor as well as to clear machining debris from the feature being cut, is provided through hose 159.

In one implementation, an imaging system is used to verify the location accuracy of the feature to be machined. The parent application, application Ser. No. 16/201,994 which is herein incorporated in its entirety, describes in detail how this is done when the camera and lens system can be installed vertically. The current invention is unable to accommodate structures or components of extensive height, due to the restrictions inherent in many internal passage structures. Therefore, this invention makes use of optical components to alter the view direction. A camera 160, powered by cable 162 is fitted with a lens system 163 that focuses the image being viewed. The figure shows the lens assembly and camera secured by clamps 166 to a mounting cradle 167 that is fitted with a reflector, shown here as a prism 165 having a front-silvered surface, that yields a 90° deflection of the viewing beam. The mounting cradle is secured to the support beam upon which the machining sub-system is mounted. The distance between the cutting tool mounted in the collet 153 and the center of the image seen by the camera 160 can be accurately determined and so the position of the feature to be cut into the part under test can be accurately located relative to any other feature in the plane of the cut within the channel. Depending upon the capability of the optical system, it may not be possible to view both the measurement reference points and the cutting tool simultaneously in a single image. To avoid the complexity of switching the optical path or repeated repositioning of the machine, a second camera system may be provided that permits simultaneous viewing of aspects of the machining process and results.

The drive motors which control each of the slides with which the appliance is equipped, are preferably linear actuators and may assume any of a number of forms. Typically these will be stepper or servo-motors that turn a ball screw, or lead screw, which in turn drive the platforms that bear the movable parts of the machine along the respective axis. The drive motors are normally selected for their ability to develop high torque coupled with accurate positioning. In the case that the motor can be a stepper motor, an electronic controller delivers properly phased power to drive the motor at the defined speed and direction so that the support beam 110 may be positioned as required to place the cutting tool or imaging system appropriately.

Not shown in FIG. 2 are the motors that drive the machine in the x and y directions. Linear precision slides are used to allow parts to move relative to one another. Typically these may be supported on ball bearings so as to minimize sliding friction and to reduce the stiction, or static friction which is undesirable because it compromises accuracy of small displacements. Well lubricated gibs are often used where rigidity is needed in a slide and permit an adjustment point to take up any wear but are less necessary in a miniaturized appliance because the loads are generally quite small. In practice, this appliance when properly adjusted at the factory should require little if any additional maintenance beyond routine cleaning and lubrication.

FIG. 3 shows the appliance in a side view. The workpiece 105, also referred to as the part or component under test, is shown as a sectioned part so that the construction of the appliance is more readily visible. The support beam 110 is shown with the attached machining sub-system and the imaging sub-system inserted into the part under test 105. The beam is fastened at either end to the vertical slides 140 and 340 each driven by a motor and drive assembly 145 and 345. The vertical slides are each attached to a corresponding slide 310 and 315 that permits motion in the x-axis, the longitudinal axis of the support beam 110. In this implementation, only slide 310 is driven by a motor and drive assembly 320, while slide 315 is free to move. For short support beams this is perfectly adequate, but if a particularly long beam is being used, then it may be beneficial to restrain the free slide 315 to maintain tension in the beam to manage vibration. In one implementation both slides 310 and 315 are driven with a motor and drive assembly. In another implementation slide 315 is fitted with a brake that allows tension to be developed in one direction and is released in the other. This limits the cutting only to tension-side strokes, but confers the benefit of better vibration control than when the beam is in compression or unloaded. The brake can be a mechanical brake or an electric/magnetic brake according to the application. If a spring is used to preload the axis, proper consideration should be given to the preload force which will increase with increasing displacement of the spring and which must be overcome by the positioning motors on the slide.

The x-axis slides are mounted on slides 330 and 331 and are driven respectively by motors and drive systems 332 and 333; for clarity, the y-axis represents movement into and out of the plane of the figure and is nominally parallel with the plane of the work table 115 and the mounting base 117 for the appliance. The three axis platforms 350 and 351 are each fitted with three adjustable feet 355 and 356 respectively so that the appliance can be leveled and adjusted. In one implementation one or more laser pointers can be attached to one of the slide assemblies to aid in preliminary alignment of the system by ensuring that both sides are level so that the support beam is properly aligned. In use, the slide assembly of one side of the appliance is installed and the opposite side then adjusted until the laser spots line up with targets marked on the first side. Bubble levels are incorporated in the slide assembly base plates to allow the initial leveling of the individual slide assemblies. The support beam must, of course, be able to be positioned so that it lies within the channel in the workpiece 105 which, may be in any position. Adjustable fastenings are provided on the support beam or as additional components so that the required initial vertical position can be achieved. Because of the uncertain vibration characteristics of structures with significant overhang or offset, in one implementation the mounting plates for the platform are provided with a range of heights in addition to having adjustable feet. These are then selected for any particular requirement and allow sufficient motion in the driven z-axis slide to perform the machining process on a wide range of parts under test.

The camera 160 is mounted so that it is a defined distance from the machining location. The camera position offset from the machining point may be calibrated by machining a spot, lifting the cutting tool and then moving the beam 110 supporting the camera under manual control so that the image of the machined spot is centered in a graticule, which may be either a permanent part of the camera or lens assembly or else electronically generated. The difference between the starting position of the camera that corresponds to the machining position and the position where the machined aspect is centered in the camera visual field represents the camera offset. This offset may be stored as a computer constant and, when a feature is identified visually, the machine tool may be moved to the point by simply adding or subtracting this stored constant as appropriate. To protect the lens of the camera, and to improve contrast in the image, a lens hood or shroud may be fitted. Optionally a source of illumination may be collocated with the shroud or added externally. The light source may be monochromatic or polychromatic. By using light emitting diodes of various emitted colors in suitable combination, the image quality may be optimized. The reflecting element that rotates the optical path through 90° is subject to contamination so shrouding of this component, including the provision of an air blast to exclude droplets or particulates, is an aspect of some implementations.

Returning to FIG. 2, a high speed motor 150 drives a cutting tool in collet 153 is mounted to the support beam 110 along with a nominally 90° gearbox 155. The gearbox may be integral with the high speed motor to reduce the number of parts and keep the mass as low as practical. The cutting tool is moved to the intended operating point and a programmed cut made according to the intended feature. The cutting depth is controlled by operation of the z-axis drive when the intended cut lies in the plane of the x-y axes. Preferably the spindle speed should be high; in one implementation, this speed ranges from 10,000 to 100,000 rpm so that the optimal cutting rates may be achieved. In most applications a carbide tipped end-mill is sufficient to perform the machining actions; the cutting tool will usually be determined by the application and the material to be cut.

To avoid the need for coolant or lubricant at the point of cutting, very light cuts may be taken, in the neighborhood of a few ten-thousandths to a few thousandths of an inch (in one application the optimal cut is about 0.004 inches or approximately 100 µm) per cutting pass. This of course will mean that numerous passes will be required in order to achieve a reasonable depth to provide sufficiently accurate information. Working depths of approximately 5 mm are generally adequate to allow for the release and measurement of surface stresses for either a slot or a hole depth, though this may be determined by considering the material and other pertinent information.

At the high spindle speeds used in this appliance, significant currents are applied to the motor when under load. This results in heat being generated in the motor itself from both the $I^2R$ losses in the windings as well as eddy current or iron losses in the core. This heat, though not particularly injurious to the motor, presents a potential burn hazard for an operator, so the motor may be fitted with a shroud to which airflow is directed. This cooling air may be piped through a filter to remove any contaminants that may be present in the supplied air. If other than dry clean air is passed over the motor, then a residue may be trapped or deposited at the motor surface and may act as an insulating barrier that would significantly increase the operating temperature of the motor and might cause accelerated failure. Typical contaminants from compressed air include water, oil and debris all of which are best removed. Although factory compressed air is often available, simple air pumps will also suffice in general but these too will contain dust and dirt particulates that may hamper successful operation. Because the air being used to cool the motor is being heated, it is important to consider the effects of this on the part under test; for massive parts this is usually not problematic but if the part under test is of light construction, then careful design of the exhaust shroud can ensure that the minimum amount of the part is exposed to this warm air blast. In one implementation a plastic shroud limits the flow of heated exhaust air onto the part whilst channeling a part of the cooling airflow, piped to the motor inlet, to the cutting area to clear the debris produced during the cut.

For larger channels where access is comparatively easy, strain gauge arrays are often simple and suitable but as the dimensions of the channel get reduced there comes a point where the installation of a strain gauge assembly becomes quite difficult, especially when the surface to be cut exhibits small radius of curvature. The addition of wiring to bring the signals to the measurement equipment complicates matters since limited access makes soldering difficult or unreliable. In this case, the preferred solution is to use an optical system and reliance on the natural roughness of the surface to provide unique, distinguishable reference points. Interferometry is an established technique well known to those skilled in the art. Modern, miniaturized optical devices make the provision of coherent illumination coupled with fine optics a practical and economical solution to making precision measurements in a small or confined space. Such components may form part of the imaging or camera system or may be included as additional components, secured as appropriate.

Accurate positioning of the support beam so as to position the cutting tool normal to the surface at the intended point for the feature that will be cut is relatively important and so, in addition to the equipment or sub-systems already described, a means of determining that the beam travels parallel to the local area of interest is needed. In one implementation a linear variable differential transducer is fitted to the beam and the profile of the local area is measured. FIG. 4A shows a typical LVDT 405 secured to the beam 110 by clamps 415. The LVDT sensor is coupled to the control electronics by cabling 410. Ideally the sensor should be fairly close to the cutting tool location and in practice may be simply mounted on the opposite side of the beam from the tool itself. This does introduce some additional lower limit on the size of channel that can be treated because the offset introduced is a clearance factor. In use, the beam is lowered using the z-axis controls until the LVDT is in good contact with the surface to be machined. Then the beam is moved in the x-axis direction and profile of the surface is mapped relative to the beam position. The start and finish point for the profiling pass should include the region that has been designated for machining the feature for the test. If the profile shows increasing or decreasing distance of the surface to be machined from the proximate surface of the support beam, the support beam angle may be finely adjusted by altering either or both z-axis slide positions so that the average profile change along the profiling path approaches zero, which indication implies that the cutting tool will be approximately orthogonal to the surface. In another implementation, the imaging sub-system may be used to determine the flatness of the region by measuring the focus change over the selected region and then compensating by altering the z-axis slides so that the region remains in close focus along the predetermined path. In both cases a control system computer is able to perform these actions automatically and without requiring manual intervention. When automatic operation is selected, it is important that coarse alignment be completed so that no hard contact results from the system being grossly misaligned or else travel limited by being set to one extreme end of the z-axis slide travel.

The cutting process, though quite fine by normal standards, is a fairly violent action whereby cutting flutes on the cutting tool sequentially cut or tear the metal surface of the part under test. Although the support beam that carries the cutting and imaging apparatus is quite stiff, and relatively massive, it may be prone to vibration at certain frequencies. Because the beam may be quite long, the resonant frequency can be quite low. Because the resulting oscillations can cause uneven cuts as well as excessive pulsating side loads on the cutting tool, it is preferred if this is minimized. Accordingly, a vibration sensor 420 is attached to the beam and coupled to the control electronics by cable 425. The primary source of excitation of any resonant vibratory modes is the machining sub-system. The drive motor, its gearbox and the pulsating load from the cutting tool provide a source of excitation that may prove troublesome so by monitoring the vibration an indication of the condition is received by the control electronics. In one implementation, a motor controller is used to adjust the cutting speed within a predetermined range so as to reduce the in-phase excitation and thus move out of the resonant range of the mechanical assembly.

FIG. 4B shows an example of another preventive method whereby the resonance effect is diminished. Here, a layer of rubber 450 is bonded to the support beam on the opposite side from the machining and imaging components using a suitable adhesive 452. Natural latex is quite durable and is dead-beat, meaning that it will simply absorb vibration energy rather than return it to the system so as to sustain vibration. In one implementation using a closed rectangular form tube, a latex is used to fill the inner volume of the tube to limit vibration.

As configured, the appliance is suitable for cutting slots and holes appropriate for measuring strain and determining stress. More complex structures, such as an annulus or a cross are possible but, because of the radius of curvature of an inside channel which may be quite small, even machining requires a knowledge of the actual profile. For the small regions of interest typical of the application described for this invention, an LVDT may be used to determine this as well. Once the reference profile along the longitudinal direction has been created, the beam may be raised, or lifted from the surface being profiled and then simply offset by a few millimeters to each side in turn and the differences measured in the transducer displacement used to determine the topography of the region. Because this profiling task can be automated, the required position of the cutting tool can then be computed from the profile data and the control program executed to generate the cut. Provided that the profiling data points are sufficiently close, the tool path can be specified sufficiently accurately to cut an annulus or a cross or indeed any specific feature.

In use, the appliance of FIG. 1 is coupled to a control system that comprises electronics for controlling the positioning motors, the machining motor and interfacing with the sensors used to measure position and vibration as well as the imaging components. A computer is coupled to this array of interfacing electronics and usually a display and a keyboard may be provided for user interface needs. Pointing devices such as a mouse or a trackball as well as specialty interface components such as a joystick, touchscreen or haptic controller may also be provided according to the custom needs of a particular application.

Although a general purpose computing platform such as a laptop or desktop machine may be used, application specific computers offer the ability to completely customize and optimize the appliance. In one implementation, the computer control, measurement and processing is performed in an embedded single card computer using external connections for display monitor and user interface elements. Computer software or firmware determines how user information is input and how it is used to control aspects of the appliance itself.

In another aspect of the appliance, an enclosure or cover can be provided to protect the system from difficult or dirty working conditions. Because the appliance is exposed due to the need for an element of the appliance to penetrate a channel in the part under test, simple covers for the slides are generally all that need to be provided. Clean air can be supplied for cooling and chip clearing of the debris from the machining process. It should be clear that bottled, dry gases such as nitrogen or argon can serve the same purpose if compressed air is not conveniently available.

In sum, the present invention provides systems and methods for analysis of material properties of components and structures using machining processes to enable stress relief in the part under test, including internal surfaces. The advantages of such a system include the ability to improve the state of the art as regards machining accuracy for fixed laboratory use, cut residual stress relief features including all of a hole, an annulus and a slit using a single tool without requiring a tool change, enable automated measurement of the material strain condition and be able to be used in remote locations without significantly changing the performance of the apparatus.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

We claim:

1. A method for measuring residual stress in a component under test having one or more strain or displacement monitors operationally coupled to a strain or displacement measurement system, the method comprising:
positioning a machining appliance and the component under test (CUT) in appropriate relative positions so that cuts can be made into the CUT;
locating a machining point determined by placement of the one or more strain or displacement monitors near which material is to be removed from the CUT;
machining a feature starting at the point onto the CUT, wherein the machining includes a plurality of light cuts made without introducing additional stress from the machining process, so that residual stress in an area proximate to the feature is interrupted from a bulk of the CUT;
wherein the machining point on the CUT is identified using an image sensor having a fixed offset relative to a cutting axis of the machining appliance, and wherein the image sensor is positioned to use one or more reference points associated with the one or strain or displacement monitors, to identify the machining point on the CUT; and
measuring, using the one or more strain or displacement monitors, a change in strain or displacement resulting from the machining process for use in calculation, and wherein the calculation includes an offset calibration factor indicating a position of the image sensor relative to the one or more reference points when the image sensor identifies the machining point.

2. The method of claim 1 wherein the strain monitor is a strain gauge.

3. The method of claim 1 wherein the strain monitor is an optical device.

4. The method of claim 1 wherein the machining appliance is positioned relative to the CUT by a motion platform having two or more mutually orthogonal axes of motion.

5. The method of claim 1 wherein the motion platform includes at least one slide corresponding to at least one of the two or more mutually orthogonal axes of motion, wherein the machining appliance is supported by a support beam, and wherein the support beam is operatively coupled to the at least one slide at both ends of the support beam thereby enabling the machining appliance to be positioned accurately relative to the CUT in one of the axes of motion.

6. The method of claim 5 wherein the support beam includes an energy absorbing material on at least one surface of the support beam.

7. The method of claim 6 wherein the energy absorbing material includes at least one of natural latex material, synthetic latex material and polyurethane.

8. The method of claim 5 wherein the support beam includes a hollow section thereby improving a weight-to-strength ratio.

9. The method of claim 5 wherein the support beam has a T or a H cross sectional profile thereby improving a weight-to-strength ratio.

10. The method of claim 5 wherein the support beam is fitted with one or more vibration sensors.

11. The method of claim 5 wherein each end of the support beam is operatively coupled to a corresponding drive mechanism.

12. The method of claim 5 wherein one end of the support beam is operatively coupled to a drive mechanism and wherein an opposing end of the support beam is coupled to a bearing.

13. The method of claim 1 further comprising adjusting a cutting speed of the machining appliance to reduce vibration.

14. The method of claim 1 wherein the internal surface of the CUT is curved.

15. The method of claim 1 further comprising visual monitoring of the feature during machining, and wherein the visual monitoring uses the image sensor.

16. The method of claim 15 wherein the image sensor is shrouded from machining debris.

17. The method of claim 1 wherein the image sensor is remote and images are captured using at least one of a mirror and a fiber optics component.

18. The method of claim 1 further comprising removing machining debris.

19. The method of claim 1 wherein the machining debris removal is assisted by an air blower or a vacuum.

20. An appliance for use in residual stress analysis of a component under test (CUT), the appliance comprising:
a motion platform having two or more mutually orthogonal axes of motion;
an image sensor, mounted to the motion platform, having a viewing area orthogonal to a cutting axis of a machining tool, and having a fixed offset relative to the cutting axis;
a drive mechanism for each motion axis coupled to a control system, wherein the drive mechanisms are operable,
to cause the machining tool, under control of the control system, to machine a feature, based at least in part upon a machining point on a component under test (CUT) identified using the image sensor and upon the fixed offset, and to position the image sensor to use one or more reference points to identify the machining point on the CUT;

wherein the machining tool is mounted to the motion platform and coupled to the control system, wherein the machining tool is configured to machine a plurality of light cuts in the CUT without introducing additional stress from a machining process, so that residual stress in a sensed area proximate to the machined feature of the CUT is interrupted from a bulk of the CUT; and wherein the control system includes a processor and interface enabling the entry and execution of operational instructions and parameters, a display of images, and the calculation and storage of measured and derived information wherein the parameters include an offset calibration factor that indicates a position of the image sensor, relative to the one or more reference points associated with a sensor located in the sensed area, when the image sensor identifies the machining point, and wherein the sensor is configured to measure strain or displacement of the sensed area.

21. The appliance of claim 20 wherein the motion platform includes at least one slide corresponding to at least one of the two or more mutually orthogonal axes of motion, and wherein the machining tool is supported by the at least one slide.

22. The appliance of claim 21 wherein the machining tool is supported by a support beam, and wherein the support beam is operatively coupled to at least one slide at both ends of the support beam thereby enabling the machining tool to be positioned accurately relative to the CUT in one of the axes of motion.

23. The appliance of claim 22 wherein the support beam includes an energy absorbing material on at least one surface of the support beam.

24. The appliance of claim 22 wherein the support beam includes a hollow section thereby improving a weight-to-strength ratio.

25. The appliance of claim 22 wherein the support beam is fitted with one or more vibration sensors.

26. The appliance of claim 21 wherein the at least one slide is fitted with at least one laser pointer and corresponding target to aid in alignment of the at least one slide.

27. The appliance of claim 20 wherein the drive mechanism is distal from the internal surface of the CUT.

28. The appliance of claim 20 wherein the internal surface of the CUT is curved.

* * * * *